United States Patent [19]
Hofer et al.

[11] 3,873,266
[45] Mar. 25, 1975

[54] SOLUTIONS OF POLYALKYLENE POLYAMINE-CYANAMIDE CONDENSATION PRODUCTS

[75] Inventors: Kurt Hofer, Muenchenstein; Robert Christian Keller, Basel; Alfred Emil Zingg, Allschwil, Baselland, all of Switzerland

[73] Assignee: Sandoz Ltd. (a/k/a Sandoz AG), Basel, Switzerland

[22] Filed: Aug. 6, 1973

[21] Appl. No.: 385,739

Related U.S. Application Data

[63] Continuation of Ser. No. 126,271, March 19, 1971, abandoned.

[52] U.S. Cl............................. 8/74, 8/165, 8/172, 8/85
[51] Int. Cl.............................. D06p 5/02
[58] Field of Search ................... 8/74, 165; 162/162

[56] References Cited
FOREIGN PATENTS OR APPLICATIONS
657,733   9/1951   United Kingdom.................. 8/74

Primary Examiner—Donald Levy
Attorney, Agent, or Firm—Gerald D. Sharkin; Richard E. Vila; Thomas C. Doyle

[57] ABSTRACT

A process for the production of solutions which are suitable for use as fixing agents for anionic dyes, which is characterized by the separation and removal of the water insoluble components from aqueous solutions of the condensation products (A) of polalkylene polyamines and cyanamides or the water soluble salts of (A).

6 Claims, No Drawings

SOLUTIONS OF POLYALKYLENE POLYAMINE-CYANAMIDE CONDENSATION PRODUCTS

This is a continuation of application Ser. No. 126,271, filed Mar. 19, 1971, now abandoned.

A process for the production of organic water soluble, nitrogen containing condensation products of polyalkylene polyamines and cyanamides and their derivatives is described in German Pat. No. 855,001. These condensation products are basic sirupy, almost colourless liquids or solids which can be converted into salts with the aid of monobasic or multibasic organic or inorganic acids. The basic products or their water soluble salts are suitable to be employed either as such or in conjunction with water soluble compounds of polyvalent metals such as copper, to improve the fastness properties of direct dyes on cellulosic materials. The suitable condensation products include those obtained from polyethylene polyamines and dicyandiamide, for instance from triethylene tetramine and dicyandiamide, tetraethylene pentamine and dicyandiamide, and in particular those of diethylene triamine and dicyandiamide.

Surprisingly, it has been found that these condensation products are not homogenous in their fixation action upon direct dyes : 7 percent to 20 percent of the condensation products present in the solution are of little effect or quite ineffective as fixing agent for these dyes. By suitable treatments, fractions can be obtained in which practically all the fixation power of the product is concentrated, while the other fractions present have only a slight or no fixation action at all on dyes of the said class.

Object of the present invention is a process for the production of solutions which are suitable as fixing agents for anionic dyestuff which is characterized by the separation and isolation of the water insoluble components from the aqueous solutions of the condensation products (A) of polyalkylene polyamines and cyanamides, or their water soluble salts. The solutions obtained according to this invention contain at the most 15 per cent by weight (on the total dry solid content) of the water insoluble by-products (ballast material) formed during the production of the condensation products (A), which show little or no effectiveness as fixing agents for dyes, notably direct dyes, of anionic character.

The aqueous solution from which the precipitated solids are separated can be prepared in various ways. For example, the crude condensation product can be dissolved in water at elevated temperature yielding a clear solution. Alternatively water soluble salts of the condensation product can be dissolved in water, or the condensation products dissolved in acid solution. Subsequently the solutions are allowed to stand, preferably at a temperature not higher than 30°C, for several days in order to precipitate the solids. In some cases germs can be added to accelerate the precipitation. The precipitated solid material consists of the components which are not at all or only slightly active as fixing agents. Another suitable method is to stir the crushed condensation products in water at room temperature for e.g. 3 to 20 hours; the initially finally divided precipitated solids take on a coarser, more filterable form.

According to the present process they are separated by the known methods, for example filtration, decanting or centrifuging, or a combination of these methods. A clear aqueous solution, with a minimal content of by-products, remains.

The amount of the ineffective by-products obtained during the condensation depends upon the condensing condition employed for preparing the base; it varies from about 7 to 20 weight per cent of the crude base.

Solutions containing about 10–70 percent particularly 30–60 percent dry solid content are suitable for the present process.

The solutions obtained according to the present invention show better storage stability than the solution of the crude condensation products.

The solutions according to this invention are highly suitable fixing agents for dyes of anionic character, particularly those of the direct class, on natural and regenerated cellulosic fibres in year and piece forms; and particularly in the manufacture of dyed paper. Further, they can be used, either alone or in combination with water soluble compounds of multivalent metals, such as copper, to improve the fastness properties of dyeings with direct dyes and as additives in the production of fibres. They have additionally the property of precipitating acid dyes from solution in water.

The dyeing obtained are faster to alcohol than comparable dyeings produced with the assistance of the crude condensation products.

In the following Examples, which are not intended to limit the scope of the present invention, the parts and percentages are by weight and the temperatures in degrees centigrade.

EXAMPLE 1

500 Parts of the condensation product of dicyandiamide and diethylene triamine as prepared in Example 4 of German Pat. No. 855,001 are pulverized, added to 500 parts of water at room temperature and stirred for 5 hours at 15°–30°. The resulting solution is allowed to stand for 72 hours at room temperature. A sediment forms which is separated by filtration. After drying it amounts to 47 parts.

EXAMPLE 2

A vessel fitted with a stirrer and reflux condenser is charged with 450 parts of diethylene triamine and 378 parts of dicyandiamide. The mixture is held for 6–8 hours within a temperature range of 107°–157°, then cooled and ground. 135 Parts of the reaction product are dissolved in 600 parts of water. The solution is neutralized with about 81 parts of 36.5% hydrochloric acid and brought up to 1000 parts with water. The solution is run into a tapering separatory funnel, left there for 10 days at 0°, and afterwards decanted through a filter. A clear solution is obtained, along with a white residue which dries as a powder and is removed.

EXAMPLE 3

Over a period of 60–90 minutes 1,000 parts of the condensation product of dicyandiamide and diethylene triamine produced according to Example 4 of German Pat. No. 855,001 are introduced into 860 parts of water while maintaining a temperature below 30°. 4–5 Hours after the addition a turbid solution is formed. 730 Parts of 30% hydrochloric acid are allowed to flow into the solution while keeping the temperature by means of water cooling, below 50°. The pH value is adjusted to 7.0 by a further addition of 60 parts of 30% hydrochloric acid (the pH is measured with a pH meter using a 10 times diluted solution.) On completion of neutralization 20 parts of diatomaceous earth are added and the mixture is stirred for further 15 hours. The solution is heated to 70°±5°, held at this temperature for 60–90 minutes and then without cooling, filtered through a spiral filter. The optimum filtration temperature is 50°–70°. The filter residue amounts to 70 parts, 20 parts of which are diatomaceous earth.

EXAMPLE 4

600 Parts of the condensation product obtained as in Example 11 of German Pat. No. 855,001 are mixed with 350 parts of water at 60°–70° under stirring until the condensation product is dissolved. The solution is allowed to stand for 5 days at 30° and then filtered.

EXAMPLE 5

A cotton fabric dyed with 2% Solar Violet BL (Schultz Farbstofftabellen, 7. Ed. Erg. Bd. I, p. 133 (1934) is agitated for 20 minutes at a liquor to goods ratio of 40:1 in a bath containing, on the fabric weight, 3% of the solution specified in Example 3. On removal it is rinsed and dried. The wet fastness properties are appreciably improved as compared with the untreated dyeing.

EXAMPLE 6

1,000 Parts of bleached sulphite pulp, beaten to a freeness value of 20 S.R. and of 4% consistency, are dyed in a mixing chest with 20 parts of the anionic dyes of formula

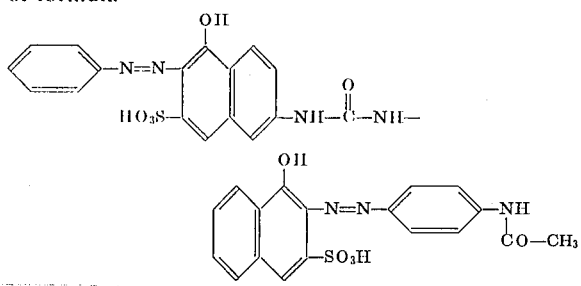

After continued mixing for 10 minutes 20 parts of the solution produced as in Example 3 are added. The stock is then converted into paper. The sheet is dyed in a shade of 2% depth which has better wet fastness, in particular better alcohol fastness, than a comparable dyeing without the stated addition.

Having thus disclosed the invention, what we claimed is:

1. In a process wherein fibers of natural or regenerated cellulose are dyed in a bath with an anionic dye and treated with a fixing agent for the dye, the improvement which comprises employing as fixing agent a solution produced by the steps of (1) mixing a condensation product (A) of a polyalkylene polyamine and dicyandiamide or a water soluble salt of (A), said condensation product containing about 7 to 20 percent by weight ineffective components, with water to dissolve the water soluble components of the condensation product, (2) allowing the resulting mixture to stand for a period sufficient to precipitate at least 85 percent of said ineffective components from the resulting solution, (3) separating the precipitate and (4) recovering an aqueous solution of said condensation product containing no more than 3 percent by weight ineffective components.

2. A process according to claim 1 wherein the polyalkylene polyamine is a polyethylene polyamine.

3. A process according to claim 1 wherein the aqueous solution of the condensation product is allowed to stand at a temperature not above 30°C. to precipitate the ineffective components prior to separation of said ineffective components.

4. A process according to claim 2 wherein the polyethylene polyamine is selected from the group consisting of diethylene triamine, triethylene tetramine, and tetraethylene pentamine.

5. A process according to claim 1 wherein, in step (2), the mixture is allowed to stand for at least 25 hours.

6. A process according to claim 1 wherein, in step (1), the condensation product (A) or salt thereof is mixed with aqueous acid.

* * * * *